(12) United States Patent
Heinrich

(10) Patent No.: US 9,371,034 B2
(45) Date of Patent: Jun. 21, 2016

(54) LIGHTING DEVICE

(71) Applicant: HELLA KGaA Hueck & Co., Lipstadt (DE)

(72) Inventor: Jürgen Heinrich, Kirchzarten (DE)

(73) Assignee: HELLA KGAA HUECK & CO., Lippstadt (DE)

(*) Notice: Subject to any disclaimer, the term of this patent is extended or adjusted under 35 U.S.C. 154(b) by 26 days.

(21) Appl. No.: 14/311,480

(22) Filed: Jun. 23, 2014

(65) Prior Publication Data

US 2014/0376222 A1 Dec. 25, 2014

(30) Foreign Application Priority Data

Jun. 21, 2013 (DE) .................. 10 2013 211 867

(51) Int. Cl.
| | | |
|---|---|---|
| *B60Q 3/02* | (2006.01) | |
| *F21Y 101/02* | (2006.01) | |
| *F21Y 105/00* | (2016.01) | |
| *F21Y 113/02* | (2006.01) | |
| *F21V 23/04* | (2006.01) | |

(52) U.S. Cl.
CPC ............ *B60Q 3/0286* (2013.01); *B60Q 3/0283* (2013.01); *F21V 23/0485* (2013.01); *F21Y 2101/02* (2013.01); *F21Y 2105/008* (2013.01); *F21Y 2113/02* (2013.01); *H01L 2251/5361* (2013.01)

(58) Field of Classification Search
CPC  B60Q 3/0286; B60Q 3/0283; F21V 23/0485; F21Y 2101/02; F21Y 2105/008; F21Y 2113/02; H01L 2251/5361
See application file for complete search history.

(56) References Cited

U.S. PATENT DOCUMENTS

| | | |
|---|---|---|
| 2007/0147036 A1 | 6/2007 | Sakai et al. |
| 2012/0235560 A1* | 9/2012 | Pickard .................... F21S 8/02 313/504 |
| 2012/0250313 A1 | 10/2012 | Shimizu et al. |
| 2012/0280631 A1* | 11/2012 | Burrows ................... F21K 9/00 315/192 |

FOREIGN PATENT DOCUMENTS

| | | |
|---|---|---|
| DE | 10 2010 034 774 A1 | 2/2012 |
| DE | 10 2011 013 206 A1 | 9/2012 |
| DE | 10 2011 016 392 A1 | 10/2012 |

OTHER PUBLICATIONS

German Search Report, Application No. DE 10 2013 211 867.8, Mar. 26, 2014, 5 pgs.

* cited by examiner

*Primary Examiner* — Mary Ellen Bowman
(74) *Attorney, Agent, or Firm* — Paul D. Strain, Esq.; Strain & Strain PLLC

(57) ABSTRACT

The invention relates to a lighting device comprising a flat light-emitting means having two side faces, wherein a first side face is transparent and a second side face is partially metal-coated, having a partially or completely metal-coated further third face, which is arranged parallel to but spaced apart from the second partially metal-coated face, and comprising at least one further light-emitting means, which outputs light in the direction of the partially metal-coated second face, which light is partially reflected on the partially metal-coated second face and is then reflected on the partially or completely metal-coated third face back in the direction towards the partially metal-coated second face and is partially transmitted through the partially metal-coated second face.

24 Claims, 3 Drawing Sheets

LIGHTING DEVICE

CROSS-REFERENCE TO RELATED PATENT APPLICATIONS

This application is based upon and claims the benefit of priority from prior German Patent Application No. 10 2013 211 867.8, filed Jun. 21, 2013, the entire contents of which are incorporated herein by reference in their entirety.

TECHNICAL FIELD

The invention relates to a lighting device, in particular for the interior of motor vehicles.

PRIOR ART

Various lighting devices in particular for the interior of motor vehicles are known from the prior art. In this connection, a distinction is drawn between an interior light, a reading light and possibly an ambient light in the lighting device, wherein the light-emitting elements in this regard of the respective lights are arranged next to one another in the plane of the lighting device and therefore take up a relatively large amount of space in the plane.

DESCRIPTION OF THE INVENTION, PROBLEM, SOLUTION, ADVANTAGES

The problem addressed by the invention consists in providing a lighting device which has an interior light and an ambient light but is nevertheless constructed simply and inexpensively in an installation space-saving manner.

The problem in respect of the method is solved by the features of Claim 1.

An exemplary embodiment of the invention relates to a lighting device comprising a flat light-emitting means having two side faces, wherein a first side face is transparent and a second side face is partially metal-coated, having a partially or completely metal-coated further third face, which is arranged spaced apart from the second partially metal-coated face, and comprising at least one further light-emitting means, which outputs light in the direction of the partially metal-coated second face, which light is partially reflected on the partially metal-coated face and is then reflected on the partially or completely metal-coated third face back in the direction towards the partially metal-coated second face and is partially transmitted through the partially metal-coated second face. As a result, firstly a first light function, such as, for example, an interior light, is generated by the flat light-emitting means and secondly a second light function, such as, for example, an ambient light, is generated by means of the further light-emitting means. The second light function, when looking at the lighting device at an angle of approximately 10° to 80° with respect to the vertical, is perceived as multiply mirroring representation of the light-emitting means or of the further light-emitting means because the light-emitting means or the further light-emitting means outputs or output light in the direction towards the second metal-coated face, which light is partially reflected and is mirrored again on the third face. Since in each case only a proportion of the light is reflected on the second partially metal-coated face and another proportion of the light passes through the partially metal-coated face, the light intensity of the multiply reflected light decreases to an ever increasing degree and a type of depth effect is generated. When looking at 0° and 90°, this effect is virtually or completely indiscernible because the multiple reflection process in this viewing direction is indiscernible. The third face can optionally be arranged parallel to the first or second face.

In this case, it is particularly advantageous if the at least one further light-emitting means is or are at least one or more light-emitting means arranged between the flat light-emitting means and the partially or completely metal-coated third face. In the case of a plurality of light-emitting means, the light-emitting means can preferably be arranged distributed around the flat light-emitting means. By virtue of the spaced-apart arrangement between the plane of the flat light-emitting means and the further light-emitting means, when viewed in the direction perpendicular to the plane of the flat light-emitting means, the multiply reflected light effect is achieved between the partially metal-coated or partially or completely metal-coated faces.

It is also expedient if the at least one further light-emitting means is or are at least one or more light-emitting means arranged adjacent to the flat light-emitting means in the plane of the flat light-emitting means. In this case, the further light-emitting means are arranged substantially in the same plane as the flat light-emitting means, but preferably a really separated from the flat light-emitting means. Thus, it is possible for the operation of the flat light-emitting means to be dissociated from that of the further light-emitting means.

It is particularly preferred if the further light-emitting means are arranged between two shields arranged parallel to one another, which shields are arranged parallel to the plane of the partially metal-coated face or to the partially or completely metal-coated face. As a result, the direct exit of light towards the front parallel to the vertical on the flat light-emitting means is prevented.

It is also advantageous if the light-emitting means is or are covered by a shield, which is or are arranged parallel to the plane of the partially metal-coated face and adjacent thereto or parallel to the plane of the partially or completely metal-coated face and adjacent thereto.

According to the invention, it is advantageous if the lighting means emits or emit light in the lateral direction with respect to the shield or shields. As a result, the light is perceived at a viewing angle of from approximately 10° to approximately 80°, while viewing at 90° or 0° to the vertical would not result in any such light effects of in particular ambient light.

It is also advantageous if the partially or completely metal-coated face is a face of a cover glass or of the flat light-emitting means. In the case of the cover glass, said cover glass can protect the flat light-emitting means. For the case where there is no cover glass, the flat light-emitting means can itself form, with its translucent carrier or with its anode or cathode, the basis for the mirroring. Thus, installation space and costs could still be saved.

It is also advantageous if the flat light-emitting means is covered by a cover glass. In this case, the flat light-emitting means can be covered on the exit side by a cover glass or by the substrate. Advantageously, a light disk can furthermore also be provided thereon. Alternatively, however, this light disk can also be dispensed with, which saves on installation space and costs.

It is also advantageous if the partially or completely metal-coated face has an only partially metal-coated or non-metal-coated region, to which a further light-emitting means is assigned. In this case, a type of window is thus provided, through which a further, third light-emitting means can emit light in order to transilluminate the flat light-emitting means. In this case, for example, very local transillumination can be realized, which is advantageous in the case of a reading light function, for example. In an advantageous exemplary embodiment, it is particularly advantageous if more than one such third light function is arranged. As a result, a plurality of such windows are provided, which are distributed behind the flat light-emitting means in order to provide a reading light for various seat areas of the vehicle, for example.

It is particularly advantageous if the further light-emitting means is an LED or are a plurality of LEDs.

It is also advantageous if the flat light-emitting means and/or the further light-emitting means is or are an OLED.

In this case, it is expedient if the flat light-emitting means is arranged on a substrate.

In this case, it is expedient according to the invention if the flat light-emitting means in the form of an OLED has an anode, a cathode and an organic material arranged therebetween.

It is also advantageous according to the invention if at least one or more electrically conductive capacitive faces are provided for controlling the switch-on state, the intensity and/or the color of at least one of the light-emitting means.

Further advantageous configurations are described by virtue of the description relating to the figures below and by virtue of the dependent claims.

BRIEF DESCRIPTION OF THE DRAWINGS

The invention will be explained in more detail below on the basis of at least one exemplary embodiment with reference to the drawings, in which.

PREFERRED EMBODIMENT OF THE INVENTION

Figure 1:
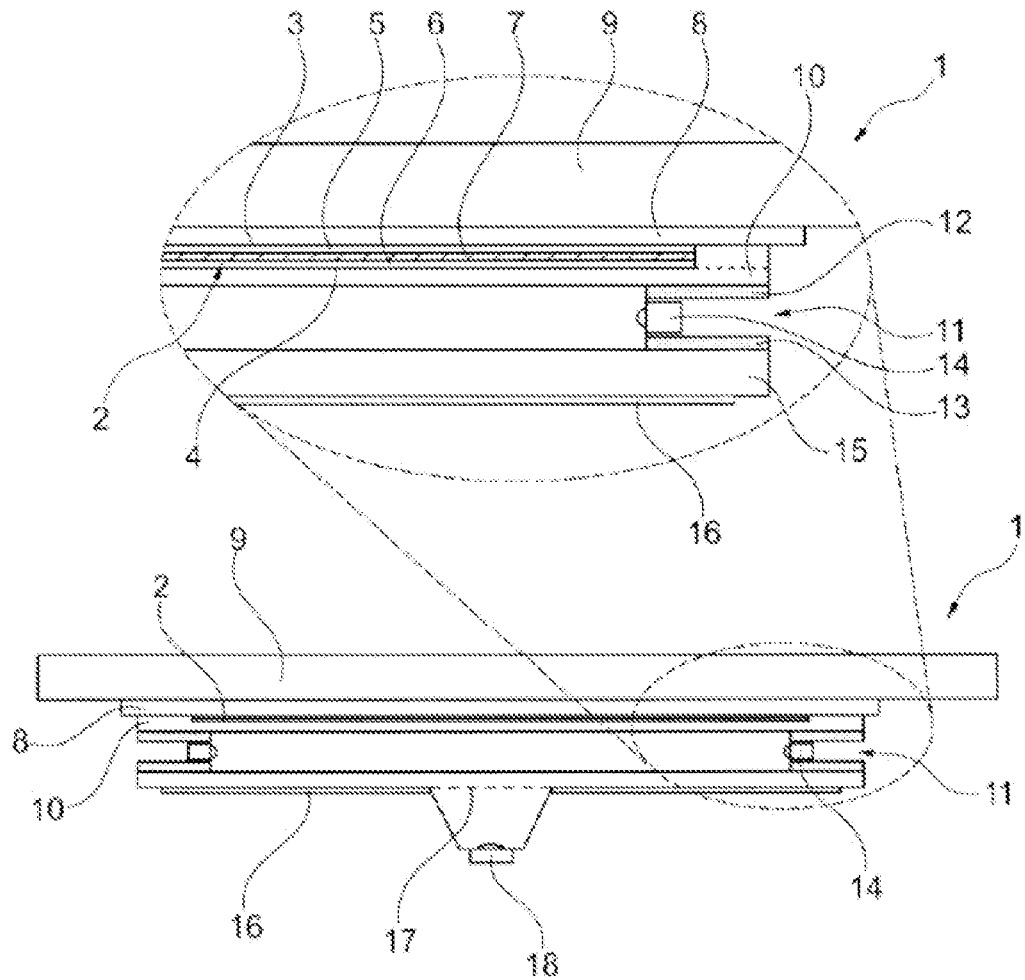
FIG. 1 shows a schematic view of a lighting device.

FIG. 1 shows an exemplary embodiment of a lighting device 1. The lighting device 1 is illustrated schematically in FIG. 1, with a subregion of the lighting device 1 being illustrated in enlarged form.

The lighting device 1 has a flat light-emitting means 2, in which a first side face 3 is transparent and a second side face 4 is partially metal-coated.

In the exemplary embodiment in FIG. 1, the flat light-emitting means 2 is formed as an LED or OLED with an anode 5, which is formed from InZnO, for example, and which is transparent, and a cathode 6, which is partially metal-coated. In this case, the cathode 6 can have a partially transparent vapor-deposited coating, for example by means of a metal plating. An organic material 7, which is caused to illuminate by virtue of a voltage being applied between the anode 5 and the cathode 6 is arranged between the anode 5 and the cathode 6. The arrangement of the anode 5, cathode 6 and organic material 7 between the anode 5 and the cathode 6 is arranged on a substrate 8, whereupon a light disk 9 is arranged. The light disk 9 is optional and can also be in the form of a glass disk or plastic disk or possibly also a film. The substrate 8 can preferably likewise be formed from glass or from a transparent plastic material. A cover glass 10 is arranged on that side of the flat light-emitting means 2 which is opposite the substrate 8, which cover glass can encapsulate the flat light-emitting means 2 on the substrate 8. This is in particular also advantageous since the flat light-emitting means 2 is or could be air-sensitive.

The flat light-emitting means 2 is used, for example, as an interior light and generates a flat light-emitting element, which can be used in a vehicle cab for illumination of the interior.

A shield arrangement 11 having the shields 12 and 13 is arranged on the cover glass 10 at the periphery thereof, wherein the shields 12, 13 are arranged in the peripheral region of the cover glass 10 and accommodate a further light-emitting means 14 between them. The further light-emitting means 14 can in this case be in the form of a single LED element or a plurality of LED elements or of other light-emitting means or at least one fiber optic conductor, for example. A glass element 15 is provided adjacent to the shield 13, which glass element has a metal coating. In this case, the metal coating forms a partially or completely metal-coated third face 16, which is arranged parallel to but spaced apart from the second partially metal-coated face 4.

In the exemplary embodiment in FIG. 1, the metal-coated face 16 is provided with a cutout in the metal coating in a selected region 17, with the result that a further light-emitting means 18 is provided, which emits light through the region 17 in order to provide a reading light function, for example. In this case, the reading light function is preferably focused by means of the light-emitting means 18 in comparison with the light function of the interior light on the basis of the flat light-emitting means 2.

Figure 2:
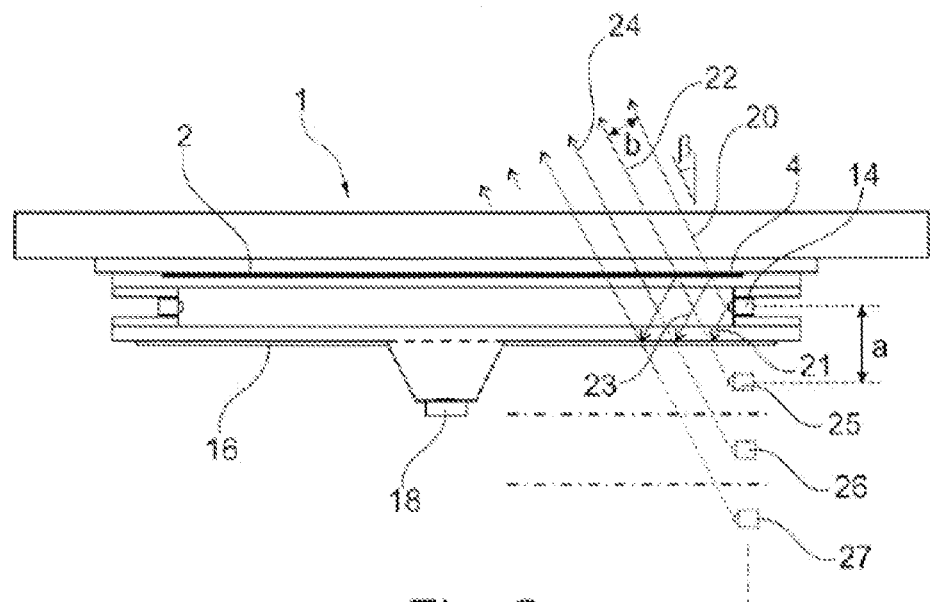
FIG. 2 shows a schematic view of a lighting device for explaining the ambient light.

FIG. 2 explains the mode of operation of the light-emitting means 14 shown in FIG. 1.

The light-emitting means 14 emits light according to the arrow 20, which light is allowed to pass through partially at the partially metal-coated face 4 or is partially reflected. A proportion of the light of the light-emitting means 14 is also emitted directly in the direction towards the metal coating 16, however, according to arrow 21. This light is reflected at the metal coating 16 and, according to arrow 22, is reflected in the direction towards the partially metal-coated face 4. The light reflected at the partially metal-coated face 4 according to arrow 20 is reflected in the direction towards the metal coating 16 according to arrow 23 and reflected there again, so that a light beam according to arrow 24 results. This produces an optical impression as though the light-emitting means 14 were provided multiply in accordance with the arrangements 25, 26 and 27, wherein, owing to the multiple reflections, the intensity of the images of the arrangements 25 to 27 of the light-emitting means 14 decreases. When viewing the lighting device 1 at an angle of approximately 10° to 80°, therefore, a multiple reflection of the light-emitting means 14 therefore appears in respect of the images 25 to 27 etc., with the result that an ambient light function can be generated.

The lighting device 1 shown in FIGS. 1 and 2 therefore has three light functions, that of an interior light according to the flat light-emitting means 2, a reading light according to the further light-emitting means 18 and an ambient light according to the further light-emitting means 14.

The reading light function can in this case also be dispensed with, with the result that the further light-emitting means 18 are not required.

Organic LEDs, so-called OLEDs, can be used as light-emitting means. In this case, the flat light-emitting means is preferably an LED or an OLED, wherein, as further light-emitting means 14 or 18, one or more LED or OLED elements can be used.

Figure 3:
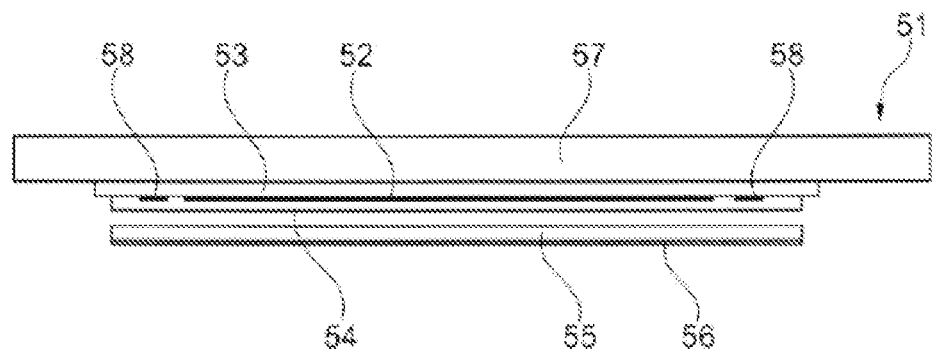
FIG. 3 shows a schematic view of a lighting device.

FIG. 3 shows a further exemplary embodiment of a lighting device 51 comprising a flat light-emitting means 52, which is arranged between a substrate 53 and a cover glass 54. A further cover glass 55, which has a metal coating 56, is spaced apart from the cover glass 54. A light disk 57 is arranged on the substrate 53. The flat light-emitting means 52 has, as in the configuration shown in FIG. 1, a first transparent side face and a second partially metal-coated side face, wherein the metal coating 56 forms a third face, which is completely or partially metal-coated. Instead of the light-emitting means 14 which is arranged in a plane spaced apart from the flat light-emitting means 2 in FIGS. 1 and 2, a light-emitting means which is arranged in the plane of the flat light-emitting means 52 and is arranged laterally spaced apart therefrom is provided as further light-emitting means 58 in the exemplary embodiment shown in FIG. 3. In this case, the flat light-emitting means 52 and the further light-emitting means 58 may be a light-emitting means which is produced jointly, but which is physically separated and drivable independently of one another. Preferably, the flat light-emitting means 52 and the further light-emitting means 58 are in the form of flat LEDs or OLEDs.

In the case of the arrangement of the further light-emitting means 58 laterally with respect to the flat light-emitting means 52, it is also possible to dispense with the shields shown in FIG. 1 or 2.

Figure 4:
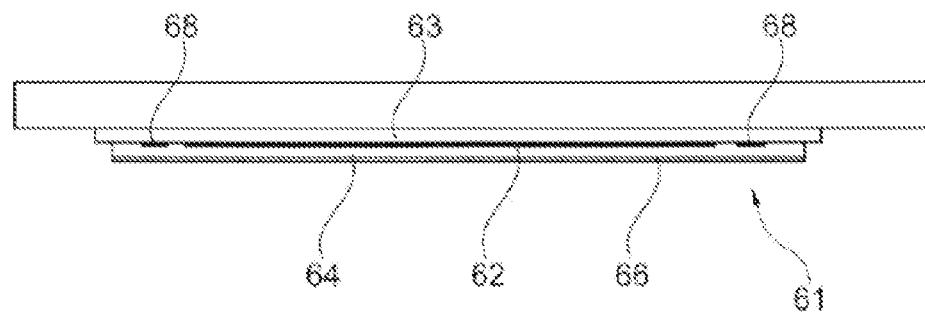
FIG. 4 shows a schematic view of a lighting device.

FIG. 4 shows a further exemplary embodiment comprising a lighting device 61 comprising a flat light-emitting means 62 and, adjacent thereto, further light-emitting means 68, wherein the flat light-emitting means 62 is arranged on a substrate 63 and is covered by a cover glass 64. In comparison with FIG. 3, the exemplary embodiment in FIG. 4 shows that the metal coating 66 is applied flat directly onto the cover glass 64, with the result that the cover glass 55 shown in FIG. 3 can be dispensed with.

The mode of operation of the exemplary embodiments shown in FIGS. 3 and 4 substantially corresponds to the mode of operation of that shown in FIG. 2, wherein the further light-emitting means 58 and 68, respectively, act in an identical manner to the light-emitting means 14.

Figure 5:
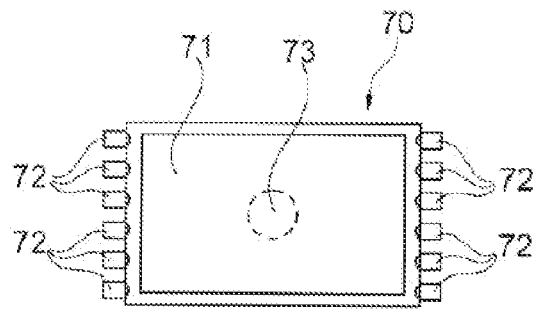
FIG. 5 shows a schematic view of a lighting device.

FIG. 5 shows an arrangement of a lighting device 70 comprising a flat light-emitting means 71 and further light-emitting means 72, which are each arranged in a row on the two opposite side edges of the flat light-emitting means, wherein the flat light-emitting means 71 is rectangular and the further light-emitting means 72 are arranged on a side edge or on two opposite side edges of the flat light-emitting means 71. The light-emitting means 73 is arranged as reading light in the central region of the flat light-emitting means 71.

Figure 6:
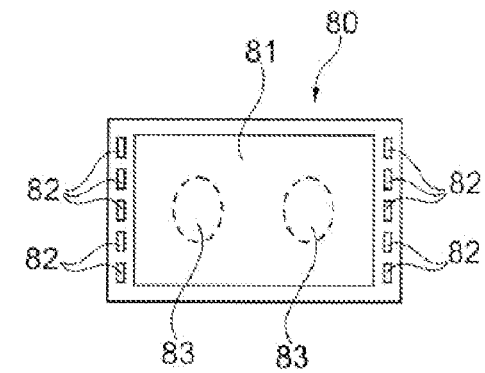
FIG. 6 shows a schematic view of a lighting device.

FIG. 6 shows an alternative embodiment of a lighting device 80 comprising a flat light-emitting means 81 and laterally arranged light-emitting means 82, wherein light-emitting means 83 are provided in the region of the flat light-emitting means 2, which light-emitting means 83 are arranged spaced apart from one another in the region of the rectangular flat light-emitting means 81.

Figure 7:
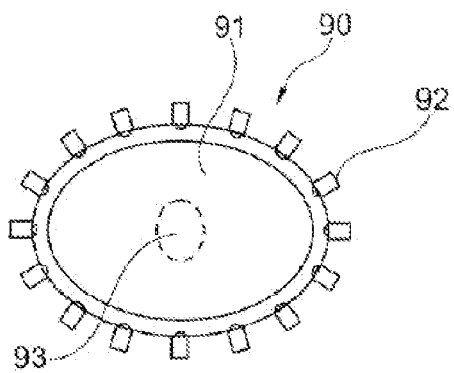
FIG. 7 shows a schematic view of a lighting device.

FIG. 7 shows a further exemplary embodiment of a lighting device 90 comprising a flat light-emitting means 91, which is oval in the exemplary embodiment in FIG. 7. Further light-emitting means 92 are arranged distributed over the circumference of the flat light-emitting means 91 and are in the form of LEDs, for example. A further light-emitting means 93 is arranged in the center of the flat light-emitting means.

Figure 8:
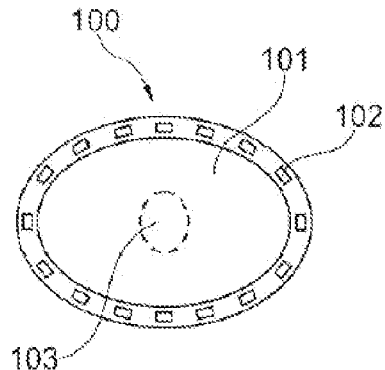
FIG. 8 shows a schematic view of a lighting device.

The exemplary embodiment in FIG. 8 shows a lighting device 100 comprising a flat light-emitting means 101 and further light-emitting means 102 distributed over the circumference, wherein, in turn, a further light-emitting means 103 is arranged in the center of the flat light-emitting means. The further light-emitting means 102 in the exemplary embodiment in FIG. 8 are formed in the same way as in the exemplary embodiment in FIG. 6 according to FIG. 3 or 4, wherein the further light-emitting means of FIG. 5 or 7 are formed in accordance with the configuration in FIGS. 1 and 2.

Figure 9:
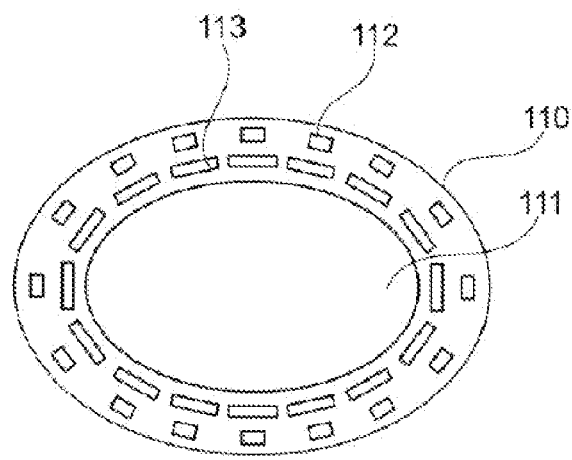
FIG. 9 shows a schematic arrangement of a lighting device.

FIG. 9 shows a further exemplary embodiment of a lighting device 110 comprising a flat light-emitting means 111 comprising a further light-emitting means 112 distributed over the circumference. Elements 113 which are arranged distributed over the circumference and are in the form of transparent electrically conductive capacitive faces, which are used to control or switch the luminaire, the brightness and/or the color, are likewise provided between the flat light-emitting means 111 and the further light-emitting means 112. In this case, by coming close to or touching these elements 113 or by a movement along these elements 113, it is possible to control, for example switch on and/or switch off, various light functions, and to implement brightness driving and/or color driving.

LIST OF REFERENCE SYMBOLS

1 Lighting device
2 Flat light-emitting means
3 First side face
4 Second side face
5 Anode
6 Cathode
7 Organic material
8 Substrate
9 Light disk
10 Cover glass
11 Shield arrangement
12 Shield
13 Shield
14 Further light-emitting means
15 Glass element
16 Metal coating
17 Region
28 Further light-emitting means
20 Arrow
21 Arrow
22 Arrow
23 Arrow
24 Arrow
25 Arrangement, image
26 Arrangement, image
27 Arrangement, image
51 Lighting device
52 Flat light-emitting means
53 Substrate
54 Cover glass
55 Cover glass
56 Metal coating
57 Light disk
58 Light-emitting means
61 Lighting device
62 Flat light-emitting means
63 Substrate
64 Cover glass
66 Metal coating
68 Further light-emitting means
70 Lighting device
71 Flat light-emitting means
72 Light-emitting means
73 Light-emitting means
80 Lighting device 81 Flat light-emitting means
82 Further light-emitting means
83 Further light-emitting means
90 Lighting device
91 Flat light-emitting means
92 Further light-emitting means
93 Further light-emitting means
100 Lighting device
101 Flat light-emitting means
102 Further light-emitting means
103 Further light-emitting means
110 Lighting device
111 Flat light-emitting means
112 Further light-emitting means
113 Element

The invention claimed is:

1. Lighting device comprising a flat light-emitting means having two side faces, wherein a first side face is transparent and a second side face is partially metal-coated, having a partially or completely metal-coated further third face, which is arranged spaced apart from the second partially metal-coated face, and comprising at least one further light-emitting means, which outputs light in the direction of the partially metal-coated second face, which light is partially reflected on the partially metal-coated second face and is then reflected on the partially or completely metal-coated third face back in the direction towards the partially metal-coated second face and is partially transmitted through the partially metal-coated second face, wherein the at least one further light-emitting means is or are at least one or more light-emitting means arranged adjacent in the plane of the flat light-emitting means.

2. Lighting device according to claim 1, wherein the at least one further light-emitting means is or are at least one or more light-emitting means arranged between the flat light-emitting means and the partially or completely metal-coated third face.

3. Lighting device according to claim 2, wherein the further light-emitting means are arranged between two shields arranged parallel to one another, which shields are arranged parallel to the plane of the partially metal-coated face or to the partially or completely metal-coated third face.

4. Lighting device according to claim 2, wherein the further light-emitting means is or are covered by a shield, which is or are arranged parallel to the plane of the partially metal-coated second face and adjacent thereto or parallel to the plane of the partially or completely metal-coated third face and adjacent thereto.

5. Lighting device according to claim 2, wherein the further lighting means emits or emit light in the lateral direction with respect to the shield or shields.

6. Lighting device according to claim 1, wherein the partially or completely metal-coated third face is a face of a cover glass or of the flat light-emitting means.

7. Lighting device according to claim 1, wherein the flat light-emitting means is covered by a cover glass.

8. Lighting device according to claim 1, wherein the further light-emitting means is an LED or are a plurality of LEDs.

9. Lighting device according to claim 1, wherein the flat light-emitting means and/or the further light-emitting means is an OLED.

10. Lighting device according to claim 1, wherein the flat light-emitting means is arranged on a substrate.

11. Lighting device according to claim 1, wherein the flat light-emitting means in the form of an OLED has an anode, a cathode and an organic material arranged therebetween.

12. Lighting device according to claim 1, wherein at least one or more electrically conductive capacitive faces are provided for controlling the switch-on state, the intensity and/or the color of the flat light-emitting means or the further light emitting means.

13. Lighting device comprising a flat light-emitting means having two side faces, wherein a first side face is transparent and a second side face is partially metal-coated, having a partially or completely metal-coated further third face, which is arranged spaced apart from the second partially metal-coated face, and comprising at least one further light-emitting means, which outputs light in the direction of the partially metal-coated second face, which light is partially reflected on the partially metal-coated second face and is then reflected on the partially or completely metal-coated third face back in the direction towards the partially metal-coated second face and is partially transmitted through the partially metal-coated second face, wherein the partially or completely metal-coated third face has an only partially metal-coated or non-metal-coated region, to which a further light-emitting means is assigned.

14. Lighting device according to claim 13, wherein the at least one further light-emitting means is or are at least one or more light-emitting means arranged between the flat light-emitting means and the partially or completely metal-coated third face.

15. Lighting device according to claim 14, wherein the further light-emitting means are arranged between two shields arranged parallel to one another, which shields are arranged parallel to the plane of the partially metal-coated face or to the partially or completely metal-coated third face.

16. Lighting device according to claim 14, wherein the further light-emitting means is or are covered by a shield, which is or are arranged parallel to the plane of the partially metal-coated second face and adjacent thereto or parallel to the plane of the partially or completely metal-coated third face and adjacent thereto.

17. Lighting device according to claim 14, wherein the further lighting means emits or emit light in the lateral direction with respect to the shield or shields.

18. Lighting device according to claim 13, wherein the partially or completely metal-coated third face is a face of a cover glass or of the flat light-emitting means.

19. Lighting device according to claim 13, wherein the flat light-emitting means is covered by a cover glass.

20. Lighting device according to claim 13, wherein the further light-emitting means is an LED or are a plurality of LEDs.

21. Lighting device according to claim 13, wherein the flat light-emitting means and/or the further light-emitting means is an OLED.

22. Lighting device according to claim 13, wherein the flat light-emitting means is arranged on a substrate.

23. Lighting device according to claim 13, wherein the flat light-emitting means in the form of an OLED has an anode, a cathode and an organic material arranged therebetween.

24. Lighting device according to claim 13, wherein at least one or more electrically conductive capacitive faces are provided for controlling the switch-on state, the intensity and/or the color of the flat light-emitting means or the further light emitting means.

* * * * *